(12) United States Patent
Adam et al.

(10) Patent No.: US 10,241,002 B2
(45) Date of Patent: *Mar. 26, 2019

(54) OPTICAL FIBER TEST APPARATUS WITH COMBINED LIGHT MEASUREMENT AND FAULT DETECTION

(71) Applicant: AFL Telecommunications LLC, Duncan, SC (US)

(72) Inventors: Sean Patrick Adam, Wrentham, MA (US); Dale Channing Eddy, Gilford, NH (US); Scott Prescott, Belmont, NH (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,572

(22) Filed: Sep. 27, 2017

(65) Prior Publication Data

US 2018/0172552 A1 Jun. 21, 2018

Related U.S. Application Data

(63) Continuation of application No. 15/381,827, filed on Dec. 16, 2016, now Pat. No. 9,880,069.

(51) Int. Cl.
*G01M 11/00* (2006.01)
*H04B 10/073* (2013.01)
(Continued)

(52) U.S. Cl.
CPC .......... *G01M 11/33* (2013.01); *G01M 11/088* (2013.01); *G01M 11/31* (2013.01); *G02B 6/3846* (2013.01); *H04B 10/0731* (2013.01)

(58) Field of Classification Search
CPC .. H04B 10/07; H04B 10/071; H04B 10/0731; G02B 6/385; G02B 6/3846; G01M 11/088; G01M 11/30; G01M 11/31; G01M 11/3109; G01M 11/3118; G01M 11/3127; G01M 11/3126; G01M 11/3145; G01M 11/3154; G01M 11/3163; G01M 11/3172; G01M 11/3181; G01M 11/319;
(Continued)

(56) References Cited

U.S. PATENT DOCUMENTS 4,268,115 A 5/1981 Slemon
4,737,026 A 4/1988 Dalgoutte
(Continued)

*Primary Examiner* — Gordon J Stock, Jr.
(74) *Attorney, Agent, or Firm* — Dority & Manning, P.A.

(57) ABSTRACT

An optical fiber test apparatus includes an optical power meter operable to detect light at a predetermined wavelength, and a laser source operable to generate a visible laser beam. The optical fiber test apparatus further includes an optical fiber extending between a first end and a second end, and a diplexer which includes a first optical connector and is coupled to the optical power meter, the laser source, and the first end of the optical fiber. The optical fiber test apparatus further includes a second optical connector coupled to the second end of the optical fiber and including a test port. The diplexer is operable to transmit light at the predetermined wavelength from the second optical connector to the optical power meter and transmit the visible laser beam from the laser source to the second optical connector.

20 Claims, 3 Drawing Sheets

(51) Int. Cl.
*G01M 11/08* (2006.01)
*G02B 6/38* (2006.01)

(58) Field of Classification Search
CPC .. G01M 11/33; G01M 11/331; G01M 11/332; G01M 11/333; G01M 11/334; G01M 11/335; G01M 11/3336; G01M 11/337; G01M 11/338; G01M 11/39
USPC .................................................. 356/73.1
See application file for complete search history.

(56) References Cited

U.S. PATENT DOCUMENTS

| | | | |
|---|---|---|---|
| 4,952,057 A | 8/1990 | Kamikawa | |
| 5,179,606 A | 1/1993 | Kaihara | |
| 7,171,081 B1 | 1/2007 | Ko | |
| 7,245,800 B1 | 7/2007 | Uhlhorn | |
| 9,880,069 B1* | 1/2018 | Adam | G01M 11/33 |
| 2002/0081080 A1 | 6/2002 | Balle-Petersen | |
| 2005/0117147 A1 | 6/2005 | Beller | |
| 2007/0172179 A1 | 7/2007 | Billman | |
| 2007/0196053 A1* | 8/2007 | Kewitsch | G02B 6/3825 |
| | | | 385/74 |
| 2007/0237195 A1 | 10/2007 | Sekigawa | |
| 2009/0086193 A1 | 4/2009 | Aoki | |
| 2009/0226136 A1* | 9/2009 | Shimizu | G02B 6/421 |
| | | | 385/60 |
| 2012/0154783 A1 | 6/2012 | Golberg | |
| 2014/0268112 A1 | 9/2014 | Foord | |

* cited by examiner

OPTICAL FIBER TEST APPARATUS WITH COMBINED LIGHT MEASUREMENT AND FAULT DETECTION

CROSS-REFERENCE TO RELATED APPLICATIONS

The present application is a continuation of and claims priority to U.S. patent application Ser. No. 15/381,827 having a filing date of Dec. 16, 2016, which is incorporated by reference herein in its entirety.

FIELD OF THE INVENTION

The present disclosure relates generally to optical fiber test apparatus, and more particularly to improved test apparatus which provide features for both measuring light transmission through optical fibers and detecting fault locations on the optical fibers.

BACKGROUND OF THE INVENTION

At present it requires three separate instruments to test and troubleshoot a failed/failing fiber span to determine where the problem may lie. The first two instruments are an optical power meter (OPM) and a matching optical light source, 'matching' defined as the light source operating on wavelengths the OPM is designed to detect and measure. The third instrument is a visual fault indicator (VFI) embodied as a visible light source, typically a laser emitting in the visible spectrum. If a fiber span fails the loss test, one of the two testing instruments must be removed and replaced with the visual fault indicator in order to locate the fault causing the loss test failure.

The use of these separate test instruments is time consuming, cumbersome, and can result in damage to the optical connector on the fiber span under test and/or the test port optical connector.

Accordingly, improved testing apparatus for optical fibers is desired. In particular, testing apparatus that reduce or eliminate the requirement for multiple separate instruments, and that thus reduce the associated time and risk involved in such testing, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an optical fiber test apparatus is provided. The optical fiber test apparatus includes an optical power meter operable to detect light at a predetermined wavelength, and a laser source operable to generate a visible laser beam. The optical fiber test apparatus further includes an optical fiber extending between a first end and a second end. The optical fiber test apparatus further includes a diplexer, the diplexer including a first optical connector and coupled to the optical power meter, the laser source, and the first end of the optical fiber. The diplexer is coupled to the first end of the optical fiber through the first optical connector. The optical fiber test apparatus further includes a second optical connector coupled to the second end of the optical fiber and including a test port. The diplexer is operable to transmit light at the predetermined wavelength from the second optical connector to the optical power meter and transmit the visible laser beam from the laser source to the second optical connector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
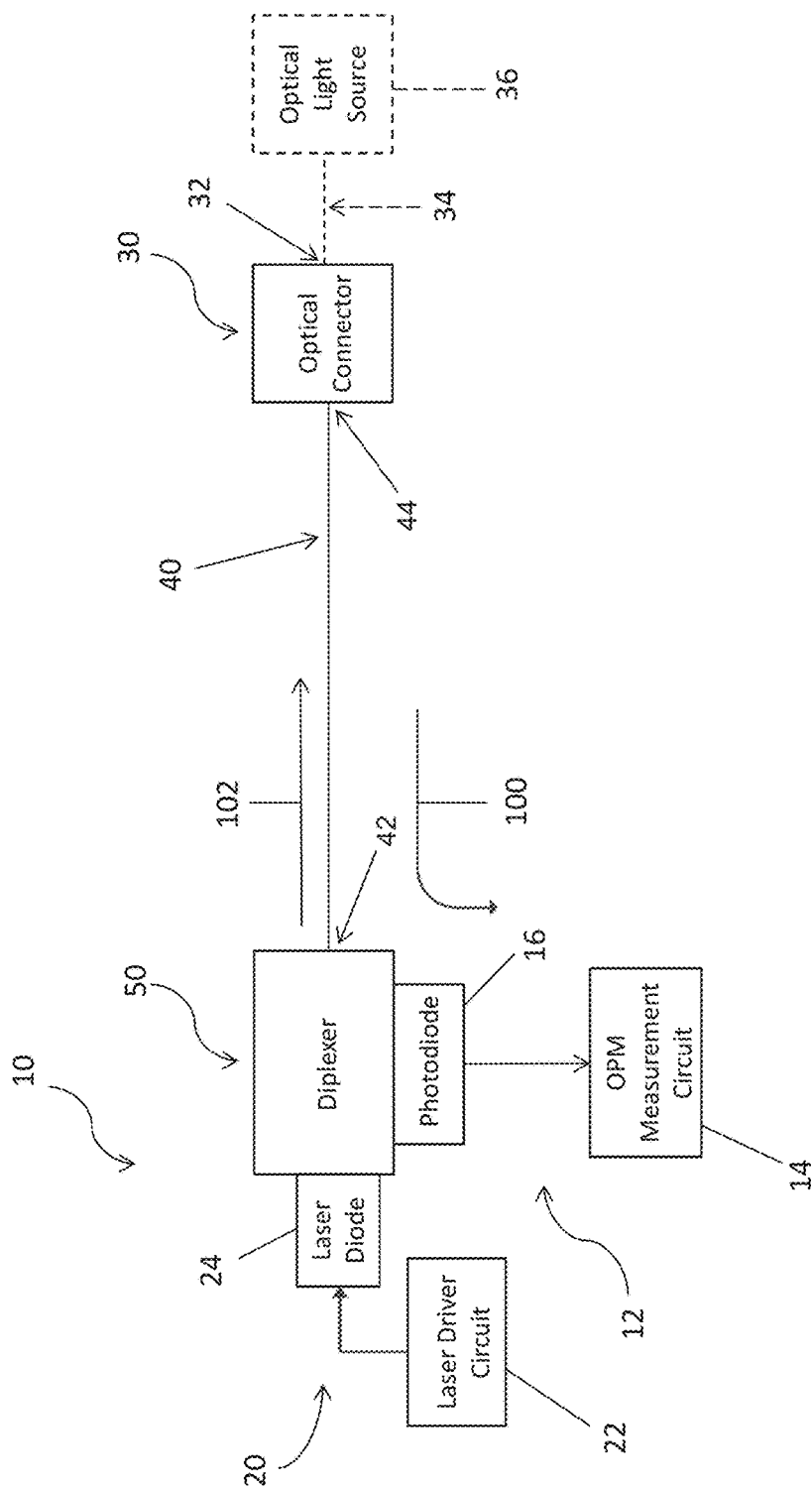
FIG. 1 illustrates an optical fiber test apparatus in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to optical fiber test apparatus which advantageously provide features for both measuring light transmission through optical fibers and detecting fault locations on the optical fibers. Test apparatus in accordance with the present disclosure include both optical power meters and laser sources, and provide novel features for simultaneously connecting an optical power meter and laser source to an optical fiber to be tested. Accordingly, testing of optical fibers utilizing test apparatus in accordance with the present disclosure will advantageously be more efficient and will reduce the risks associated with the use of separate test instruments for various testing requirements. For example, troubleshooting a failed fiber span will be made less time consuming. Test apparatus in accordance with the present disclosure advantageously eliminate the need for a separate visible light source, and eliminates the requirement to disconnect the optical power meter in order to connect a visible light source, in turn reducing the probability of damaging the optical connector on the fiber span under test and/or the test port optical connector by eliminating an optical connector/test port disconnect/connect cycle.

Figure 2:
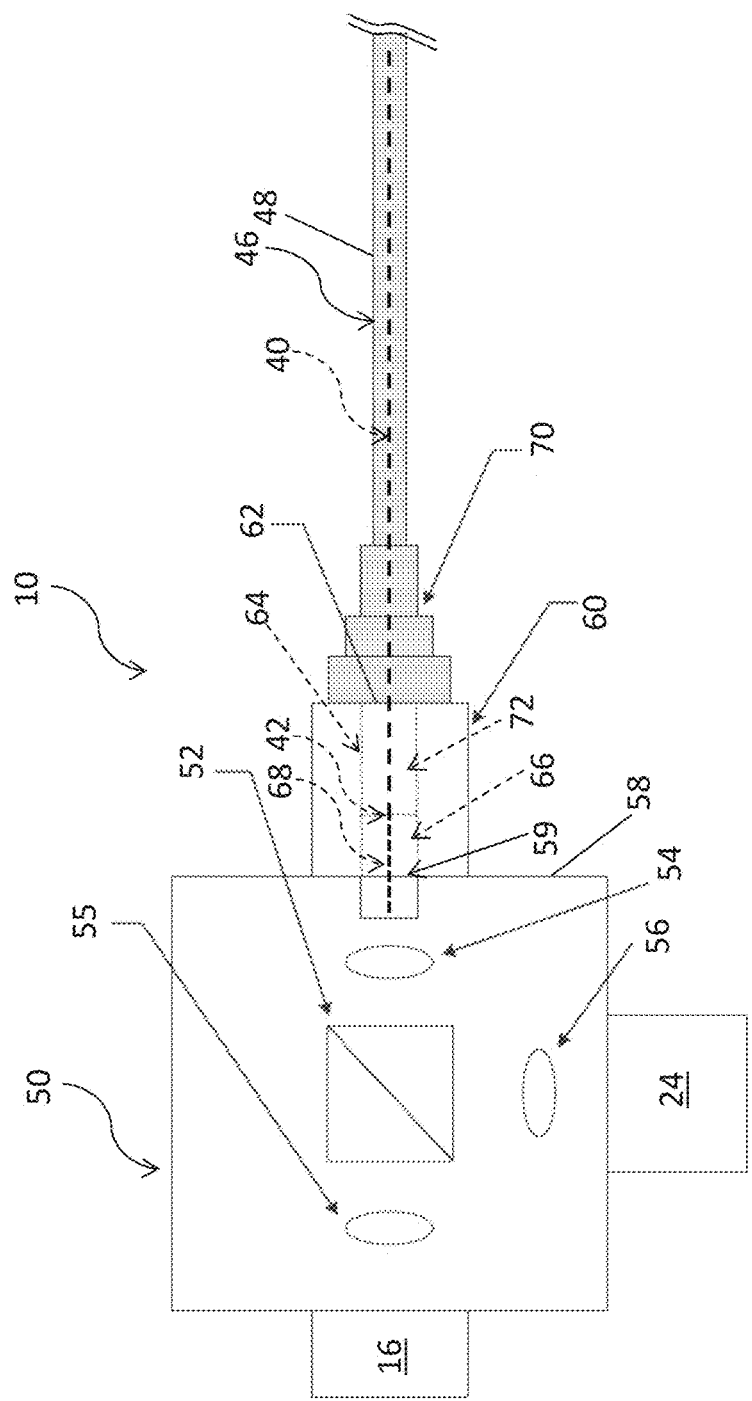
FIG. 2 illustrates components of an optical fiber test apparatus in accordance with one embodiment of the present disclosure.
Figure 3:
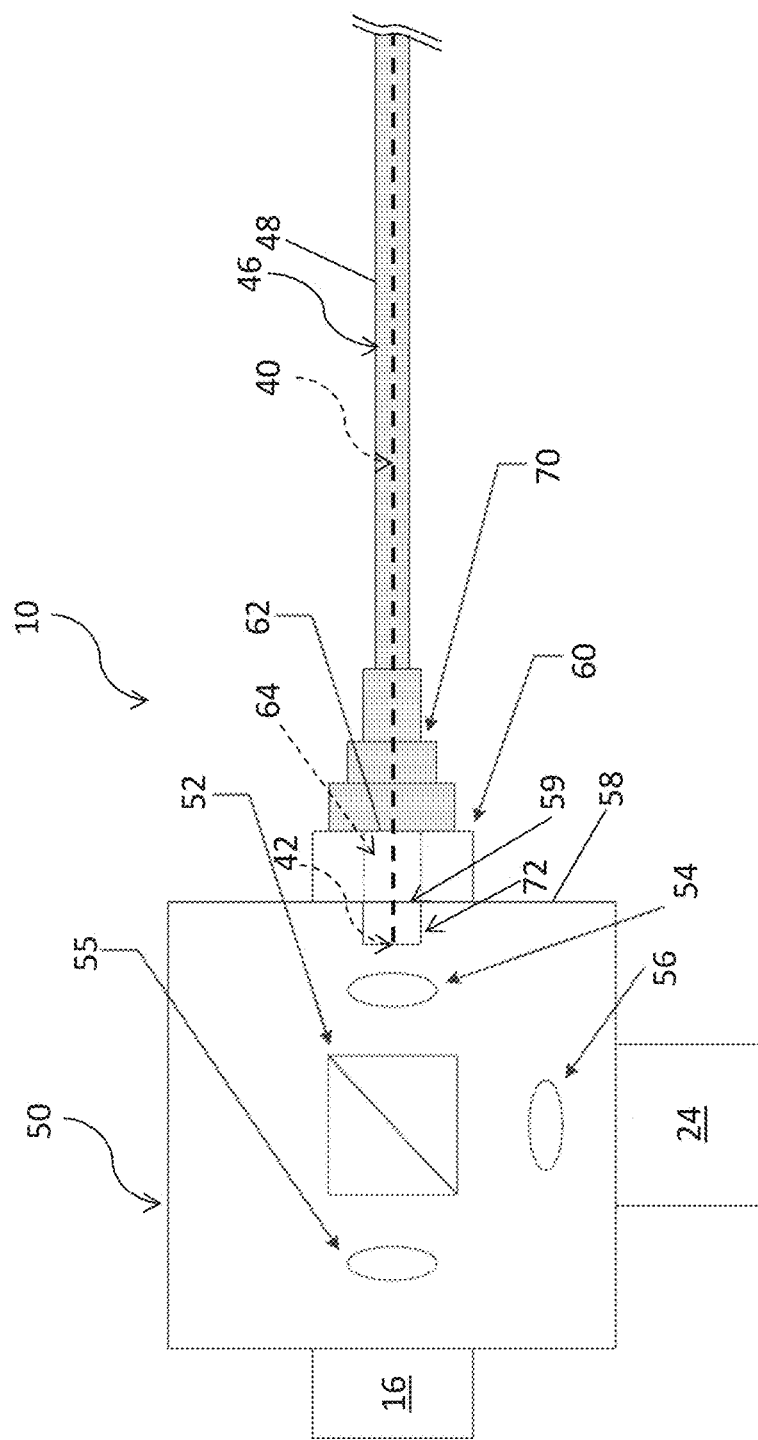
FIG. 3 illustrates components of an optical fiber test apparatus in accordance with another embodiment of the present disclosure.

Referring now to FIGS. 1 through 3, various embodiments of an optical fiber test apparatus 10 in accordance with the present disclosure are illustrated. A test apparatus 10 may include, for example, an optical power meter 12. The optical power meter 12 is generally operable to detect and measure the power of light at one or more predetermined wavelengths or ranges of wavelengths. The detected and measured light is, in exemplary embodiments, light on the infrared wavelength spectrum. Common wavelengths (i.e. those utilized in optical fibers) include 850 nanometers, 1300 nanometers, and 1550 nanometers. In general, an optical power meter 12 may include a measurement circuit 14. The measurement circuit 14 may generally convert a received signal for measurement and/or display purposes. For example, the measurement circuit 14 may convert a received current into a voltage, and send this voltage to an analog to digital converter. The resulting digital signal may then be displayed as an optical power meter 12 output.

The received current may be converted from received light at a particular wavelength. For example, in exemplary embodiments, the optical power meter 12 may further include a photodiode 16 which generally converts received light into current. This current may then, for example, be received by the measurement circuit 14.

Test apparatus 10 may further include a laser source 20. The laser source 20 may be operable to generate a visible laser beam, i.e. a laser beam within the visible wavelength spectrum (390 nanometers to 700 nanometers, such as in some embodiments 525 nanometers to 700 nanometers). In exemplary embodiments, the laser beam may, for example, be green or red. Laser source 20 may, for example, include a laser driver circuit 22. Laser source 20 may further include a laser diode 24. The laser driver circuit 22 may generally drive the laser diode 24 to produce a laser beam at a desired wavelength, i.e. a visible wavelength.

The test apparatus 10 may further include an optical connector 30, which may be referred to herein as a second optical connector 30. The optical connector 30 may include a test port 32. The test port 32 may be a port of the optical connector 30 to which an optical fiber 34 to be tested may be connected to the optical connector 30. The optical connector 30 may in exemplary embodiments be a universal connector interface or an FC connector (i.e. ferrule connector). Suitable FC connectors may include, for example, FC/UPC and FC/APC connectors. Alternatively, however, other suitable optical connectors 30 may be utilized.

Notably, the optical fiber 34 to be tested may be a single mode or multi-mode optical fiber. An optical light source 36 may generate light (i.e. infrared light) at a suitable predetermined wavelength(s) for transmission through the optical fiber 34 to the test apparatus 10 through the optical connector 30 thereof, and through the test apparatus 10 to the optical power meter 12 thereof for detection and measurement.

The test apparatus 10 may further include an optical fiber 40 which extends between a first end 42 and a second end 44. The optical fiber 40 may be a single mode or multi-mode optical fiber. In some embodiments, a core of the optical fiber 40 may have a standard diameter, i.e. approximately 50 microns. Alternatively, the diameter of the core of the optical fiber 40 may be greater than approximately 50 microns. For example, in some embodiments the core diameter may be approximately 62.5 microns or approximately 100 microns. As utilized herein, approximately means plus or minus 3 microns. The optical fiber 40 may be coupled (such as directly coupled) at the second end 44 thereof to the optical connector 30. The optical fiber 40 may provide for the transmission therethrough of light to and from the optical connector 30, and thus to and from the optical fiber 34 being tested. For example, light (i.e. infrared light) at a suitable predetermined wavelength(s) generated by optical light source 36 may be transmitted (i.e. in direction 100) from optical connector 30 to and through optical fiber 40 for transmission to the optical power meter 12. Additionally, visible laser beams may be transmitted from the laser source 20 to and through the optical fiber 40 (i.e. in direction 102), and from the optical fiber 40 through the optical connector 30 to the optical fiber 34 for, for example, fault detection purposes.

As shown in FIGS. 2 and 3, the optical fiber 40 may be a component of a cable 46 which may include the optical fiber 40 and one or more outer layers surrounding the optical fiber 40, one of which may include an exterior surface 48 of the cable 46. The first and second ends 42, 44 of the optical fiber 40 may protrude beyond the other layers of the cable 46 and into suitable optical fiber connectors which facilitate connection of the optical fiber with the second optical connector 30 and a first optical connector 60 as discussed herein.

Test apparatus 10 may further include a diplexer 50. The diplexer 50 may allow the transmission of light therethrough, and may direct light (i.e. infrared light) at a suitable predetermined wavelength(s) generated by optical light source 36 to the optical power meter 12 and visible laser light from laser source 20 to the optical connector 30 for transmission therethrough to the optical fiber 34. Diplexer 50 may thus be coupled (i.e. directly coupled) to the optical fiber 40 at the first end 42 thereof.

In general, any suitable diplexer 50 may be utilized in accordance with the present disclosure. Diplexer 50 may include, for example, a beam splitter 52, a first lens 54, a second lens 55, and a third lens 56. These components may be contained internally within a body 58 of the diplexer 50. First lens 54 may, for example, be optically aligned between the beam splitter 52 and optical fiber 40. Second lens 55 may, for example, be optically aligned between the beam splitter 52 and the optical power meter 12, such as the photodiode 16 thereof. Third lens 56 may, for example, be optically aligned between the beam splitter 52 and the laser source 20, such as the laser diode 24 thereof.

Any suitable beam splitter 52 may be utilized. For example, in some embodiments, the beam splitter 52 may be a glass, an optical film coating, or a cubic. As is generally understood, the beam splitter 52 may transmit a portion of light received by the beam splitter 52 therethrough, and may reflect another portion of the received light. Further, any suitable lenses 54, 55, 56, such as ball, convex, etc., may be utilized. It should further be understood, however, that the present disclosure is not limited to the above-described embodiments of diplexers 50 and that any suitable diplexers 50 are within the scope and spirit of the present disclosure.

The laser diode 24 and photodiode 16 may be connected, such as directly connected, to the diplexer 50. More particularly, the laser diode 24 may be optically aligned with the diplexer 50, such as with a lens 56 thereof. The photodiode 16 may similarly be optically aligned with the diplexer 50, such as with a lens 55 thereof. Visible laser beams generated by the laser source 20 may be transmitted to the diplexer 50 from the laser source 20, such as the laser diode 24 thereof, and from the diplexer 50 through the first optical fiber 40 to the optical connector 30 (and thus to the optical fiber 34). Light (i.e. infrared light) at a suitable predetermined wavelength(s) generated by optical light source 36 may be transmitted from the diplexer 50 to the optical power meter 12, such as via the photodiode 16.

Referring now in particular to FIGS. 2 and 3, the diplexer 50 may include an optical connector 60, which may be referred to herein as a first optical connector 60. The diplexer 50 may be coupled to the first end 42 of the optical fiber 40 through the first optical connector 60. Optical connector 60 may include a body 62 which may extend externally to and be in contact with the body 58 of the diplexer 50, and the body 62 may define an internal channel 64 which extends therethrough and is in communication with an opening 59 defined in the body 58 and which provides access to the interior of the diplexer 50.

In some embodiments, as illustrated in FIG. 2, the first optical connector 60 may further include a ferrule 66 and an optical fiber stub 68 disposed within the ferrule 66. The ferrule 66 and stub 68 may be disposed at least partially within the internal channel 64, and in some embodiments for example may extend from the internal channel 64 through the opening 59 and into the interior of the diplexer 50.

In exemplary embodiments, the optical fiber stub 68 is a multimode optical fiber stub 68. In some embodiments, a core of the optical fiber stub 68 may have a standard diameter, i.e. approximately 50 microns. Alternatively, the diameter of the core of the optical fiber stub 68 may be greater than approximately 50 microns. For example, in some embodiments the core diameter may be approximately 62.5 microns or approximately 100 microns. While in some embodiments the core diameter of the optical fiber stub 68 may be approximately equal to the core diameter of the optical fiber 40, in alternative embodiments the core diameter of the optical fiber stub 68 may be greater than the core diameter of the optical fiber 40.

Referring again to FIGS. 2 and 3, in exemplary embodiments an optical fiber connector 70 is provided and coupled to the first end 42 of the optical fiber 40. The optical fiber connector 70 may couple the first end 42 of the optical fiber 40 to the first optical connector 60. In other words, the first optical connector 60 and optical fiber connector 70 may connect with each other to couple the first end 42 of the optical fiber 40 to the diplexer 50.

The optical fiber connector 70 may include a ferrule 72, and the first end 42 of the optical fiber 40 may be disposed within the ferrule 72. As shown, the ferrule 72 may be inserted into the first optical connector 60, such as into the internal channel 64 thereof. Such insertion may couple first optical connector 60 and optical fiber connector 70 together, and may thus couple the first end of the optical fiber 40 to the first optical connector 60 and diplexer 50 generally.

In some embodiments, as illustrated in FIG. 3, the first end 42 of the optical fiber 40 may be exposed when the ferrule 72 is inserted into the first optical connector 60. In these embodiments, the first end 42 may not abut against or otherwise be in contact with any other fibers, and light may be emitted into the diplexer 50 directly from the first end 42 or be received into the first end 42 directly from the diplexer 50. For example, in some embodiments as shown, the ferrule 72 may extend within the internal channel 64 through the opening 59, such that the first end 42 is disposed within the interior of the diplexer 50. The first end 42 may, for example, be optically aligned with a lens 54 such that light emitted from the first end 42 (such as in direction 100) may be directed to the lens 54 and/or light transmitted by the lens 54 (such as in direction 102) is received by the first end 42.

In other embodiments, as illustrated in FIG. 2, the first end 42 of the optical fiber 40 may abut against the optical fiber stub 68, such as an end thereof, when the ferrule 72 of the optical fiber connector 70 is inserted into the first optical connector 60, such as the internal channel 64 thereof. Additionally, the ferrule 72 may abut against the ferrule 66 when the ferrule 72 of the optical fiber connector 70 is inserted into the first optical connector 60, such as the internal channel 64 thereof. In these embodiments, light may be emitted into the diplexer 50 from the first end 42 through the optical fiber stub 68, and thus directly from the stub 68, or be received into the first end 42 from the diplexer 50 through the optical fiber stub 68, and thus directly from the stub 68. The first end 42 may, for example, be optically aligned with optical fiber stub 68 such that light emitted from the first end 42 (such as in direction 100) may be directed into the optical fiber stub 68 and light emitted from the optical fiber stub 68 (such as in direction 102) may be directed into the first end 42. Further, the optical fiber stub 68 may, for example, be optically aligned with a lens 54 such that light emitted from the optical fiber stub 68 (such as in direction 100) may be directed to the lens 54 and/or light transmitted by the lens 54 (such as in direction 102) may be received by the optical fiber stub 68.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical fiber test apparatus, comprising:
    an optical power meter operable to detect light at a predetermined wavelength;
    a laser source operable to generate a visible laser beam;
    an optical fiber extending between a first end and a second end;
    a diplexer, the diplexer comprising a first optical connector and coupled to the optical power meter, the laser source, and the first end of the optical fiber, the diplexer coupled to the first end of the optical fiber through the first optical connector;
    a second optical connector coupled to the second end of the optical fiber and comprising a test port; and
    an optical fiber connector comprising a ferrule, the optical fiber connector coupled to the first end of the optical fiber with the first end of the optical fiber disposed within the ferrule of the optical fiber connector, the optical fiber connector coupling the first end of the optical fiber to the first optical connector when the ferrule of the optical fiber connector is inserted into the first optical connector, wherein the first optical connector comprises an optical fiber stub, and wherein the first end of the optical fiber is optically aligned with the optical fiber stub when the ferrule of the optical fiber connector is inserted into the first optical connector,
    wherein the diplexer is operable to transmit light at the predetermined wavelength from the second optical connector to the optical power meter and transmit the visible laser beam from the laser source to the second optical connector.

2. The optical fiber test apparatus of claim 1, wherein the first optical connector comprises a ferrule, and wherein the ferrule of the optical fiber connector abuts against the ferrule of the first optical connector when the ferrule of the optical fiber connector is inserted into the first optical connector.

3. The optical fiber test apparatus of claim 1, wherein the first end of the optical fiber abuts against the optical fiber stub when the ferrule of the optical fiber connector is inserted into the first optical connector.

4. The optical fiber test apparatus of claim 1, wherein the optical fiber stub is a multimode optical fiber stub.

5. The optical fiber test apparatus of claim 1, wherein a core of the optical fiber stub has a diameter of approximately 50 microns.

6. The optical fiber test apparatus of claim 1, wherein a core of the optical fiber stub has a diameter of greater than approximately 50 microns.

7. The optical fiber test apparatus of claim 1, wherein the optical power meter comprises a photodiode.

8. The optical fiber test apparatus of claim 1, wherein the laser source comprises a laser driver circuit and a laser diode.

9. The optical fiber test apparatus of claim 1 wherein the optical fiber is a multimode optical fiber.

10. The optical fiber test apparatus of claim 1, wherein the optical fiber is a single mode optical fiber.

11. The optical fiber test apparatus of claim 1, wherein the diplexer comprises a beam splitter and a lens optically aligned between the beam splitter and the optical fiber stub.

12. The optical fiber test apparatus of claim 1, wherein the first optical connector comprises an internal channel, the optical fiber stub of the first optical connector extending from the internal channel and into an interior of the diplexer, and the ferrule of the optical fiber connector is received within the internal channel of the first optical connector when the ferrule of the optical fiber connector is inserted into the first optical connector.

13. An optical fiber test apparatus, comprising:
  an optical power meter operable to detect light at a predetermined wavelength, the optical power meter comprising a photodiode;
  a laser source operable to generate a visible laser beam, the laser source comprising a laser driver circuit and a laser diode;
  an optical fiber extending between a first end and a second end;
  a diplexer, the diplexer comprising a first optical connector and coupled to the optical power meter, the laser source, and the first end of the optical fiber, the diplexer coupled to the first end of the optical fiber through the first optical connector;
  a second optical connector coupled to the second end of the optical fiber and comprising a test port; and
  an optical fiber connector comprising a ferrule, the optical fiber connector coupled to the first end of the optical fiber with the first end of the optical fiber disposed within the ferrule of the optical fiber connector, the optical fiber connector coupling the first end of the optical fiber to the first optical connector when the ferrule of the optical fiber connector is inserted into the first optical connector, wherein the first optical connector comprises an optical fiber stub, and wherein the first end of the optical fiber is optically aligned with the optical fiber stub when the ferrule of the optical fiber connector is inserted into the first optical connector,
  wherein the diplexer is operable to transmit light at the predetermined wavelength from the second optical connector to the optical power meter and transmit the visible laser beam from the laser source to the second optical connector.

14. The optical fiber test apparatus of claim 13, wherein the first optical connector comprises a ferrule, and wherein the ferrule of the optical fiber connector abuts against the ferrule of the first optical connector when the ferrule of the optical fiber connector is inserted into the first optical connector.

15. The optical fiber test apparatus of claim 13, wherein the first end of the optical fiber abuts against the optical fiber stub when the ferrule of the optical fiber connector is inserted into the first optical connector.

16. The optical fiber test apparatus of claim 13, wherein the optical fiber stub is a multimode optical fiber stub.

17. The optical fiber test apparatus of claim 13, wherein the optical fiber is a multimode optical fiber.

18. The optical fiber test apparatus of claim 13, wherein the optical fiber is a single mode optical fiber.

19. The optical fiber test apparatus of claim 13, wherein the diplexer comprises a beam splitter and a lens optically aligned between the beam splitter and the optical fiber stub.

20. The optical fiber test apparatus of claim 13, wherein the first optical connector comprises an internal channel, the optical fiber stub of the first optical connector extending from the internal channel and into an interior of the diplexer, and the ferrule of the optical fiber connector is received within the internal channel of the first optical connector when the ferrule of the optical fiber connector is inserted into the first optical connector.

* * * * *